Oct. 8, 1968   N. R. KUBNICK ET AL   3,404,938
SELF-STORING PROJECTOR

Filed Aug. 13, 1965   3 Sheets-Sheet 1

Inventors
Norman R. Kubnick
Allen R. Obergfell.
Barry L. Clark
John E. Peele Jr.   Attys Oct. 8, 1968

N. R. KUBNICK ET AL 3,404,938

SELF-STORING PROJECTOR

Filed Aug. 13, 1965

Inventors
Norman R. Kubnick.
Allen R. Obergfell.
By Barry L. Clark
John E. Peek Jr.
Attys

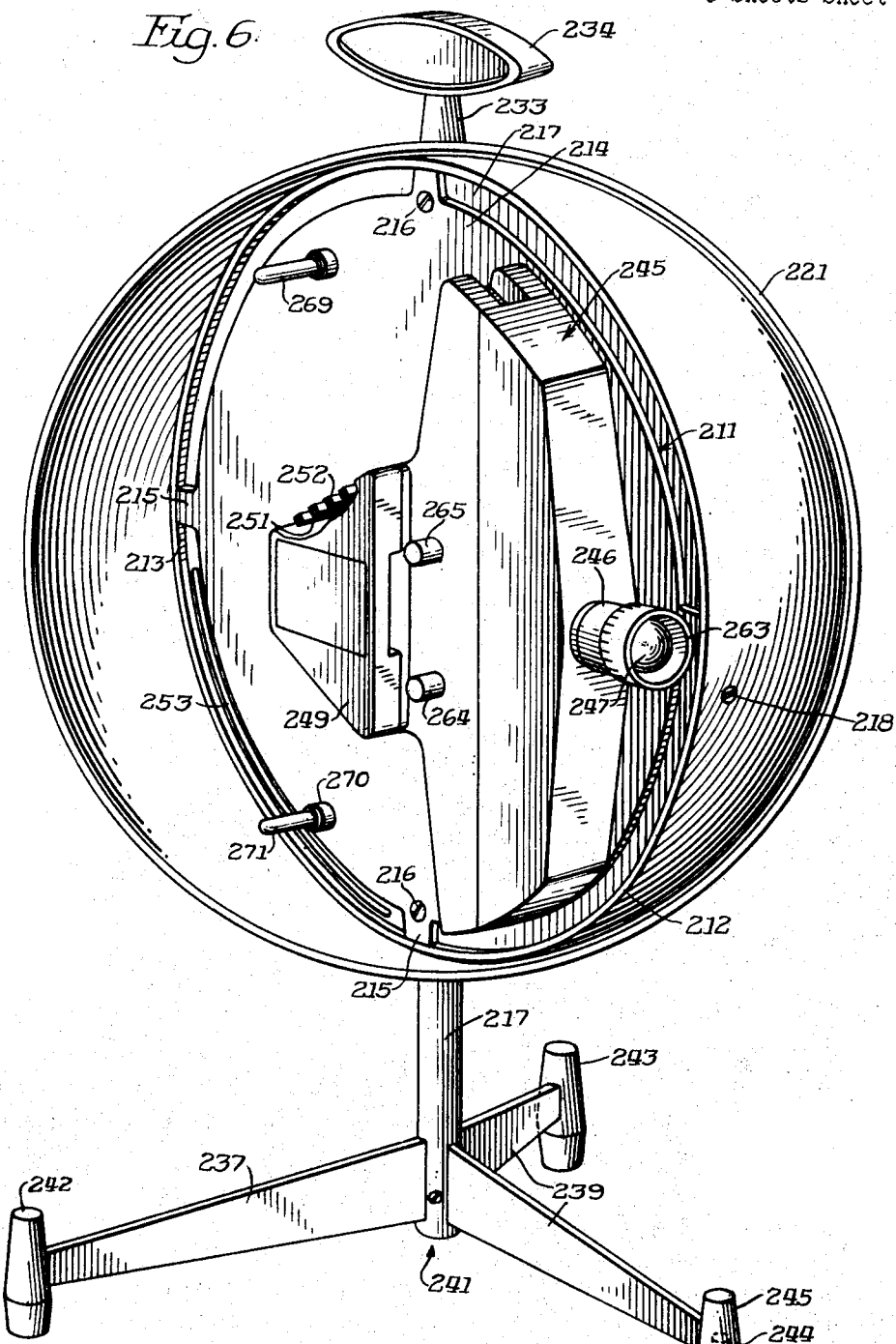

United States Patent Office 3,404,938
Patented Oct. 8, 1968

3,404,938
SELF-STORING PROJECTOR
Norman R. Kubnick, Skokie, and Allen R. Obergfell, Niles, Ill., assignors to Bell & Howell Company, Chicago, Ill., a corporation of Illinois
Filed Aug. 13, 1965, Ser. No. 479,566
14 Claims. (Cl. 352—242)

ABSTRACT OF THE DISCLOSURE

A compact, self-storing projector having a semi-globular cover which is rockable into and out of nesting relation with a projector mounting housing portion preferably of a similar shape. The cover may be releasibly locked in several adjusted positions. Film is transported horizontally to a take-up spindle positioned near the periphery of the platform over which the film travels. As the diameter of the film roll increases beyond the periphery, a film roll support member expands to support the film convolutions beyond the periphery.

---

The present invention relates to projectors. Particularly, the invention relates to a self-storing projector. Specifically, the invention relates to a combination projector and storing container.

Projectors of the home variety when not in use are customarily enclosed within cases from which the covers are removable, the cases usually being closeted for storage. One reason that projectors and their cases are removed from view when not in use is that the same are unsightly when considered in terms of decor of the rooms within which such projectors are usually employed in homes. To some extent because of the effort involved in setting up conventional projectors and returning them to storage following use, employment thereof heretofore has been curtailed.

In accordance with the present invention and as an object thereof there is provided a self-storing projector.

It is another object of the present invention to provide a combination projector and storage case having interacting components which lend themselves to esthetic arrangement adapted to augment the decor of a room in which the projector might be used.

An additional object of the invention is the provision of a self-storing projector comprising a projector mount of semi-globular configuration and a semi-globular shell pivoted to the semi-globular mount to cover and expose a projector which upon exposure is adapted for operation and which upon covering becomes wholly enclosed in a spheroidal construction.

A further object of the invention is the provision of a combination projector and case therefor comprising a pair of connected together nestable sections, one thereof being a permanent adjustable mount for the projector and the other of said pair being a cover rockable about the mount.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 6 is a perspective view of another embodiment of the invention.

Figure 1:
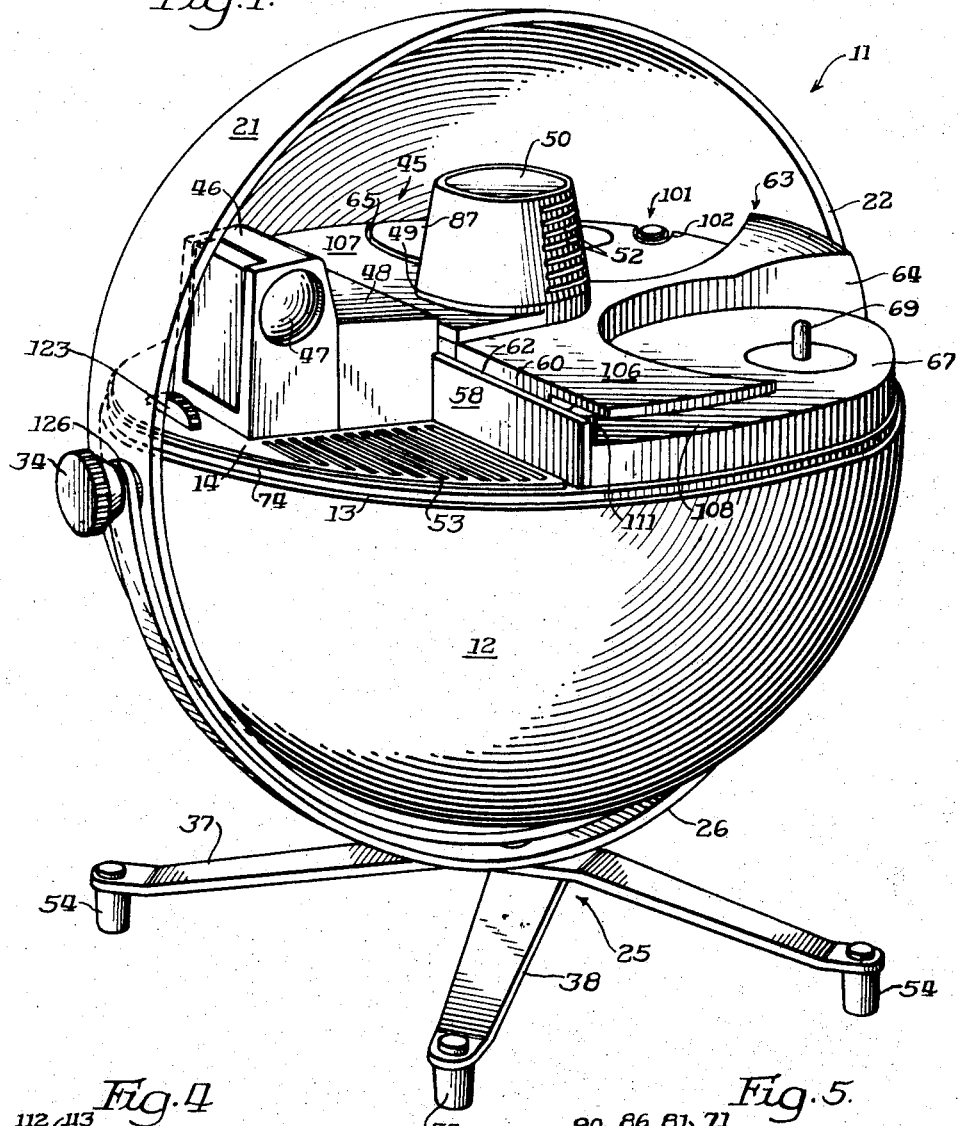
FIG. 1 is a perspective view of one embodiment of the present invention characterized by a horizontal support for the projector.
Figure 2:
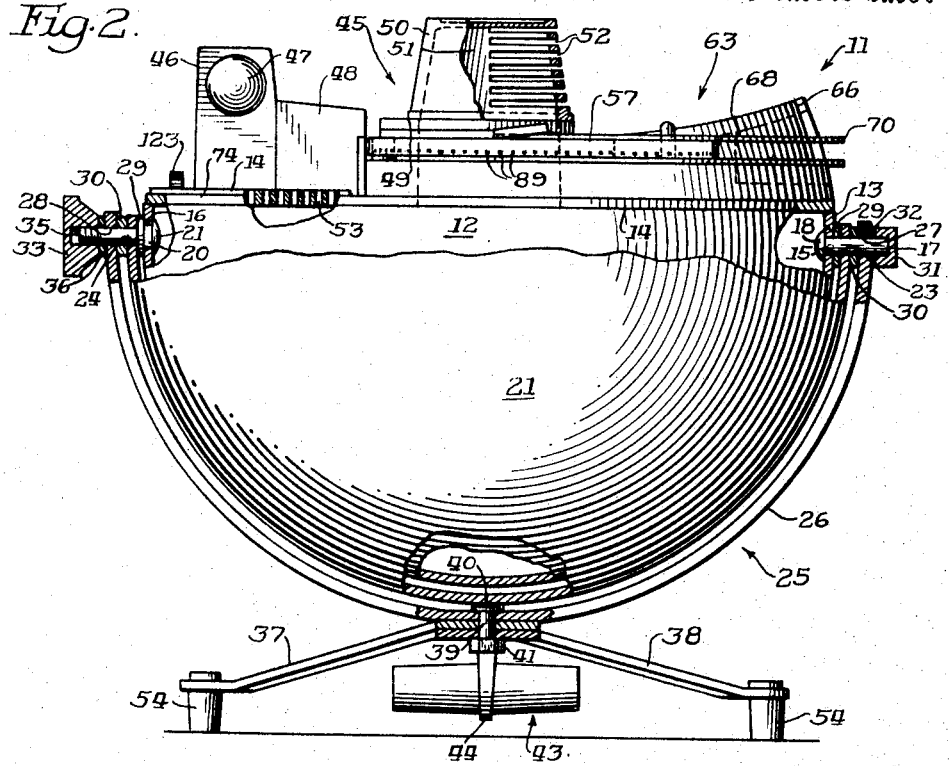
FIG. 2 is an elevational view of said embodiment looking at the front of the projector; parts having been broken away for the purpose of illustration, the cover being shown conditioned to completely open position.
Figure 3:
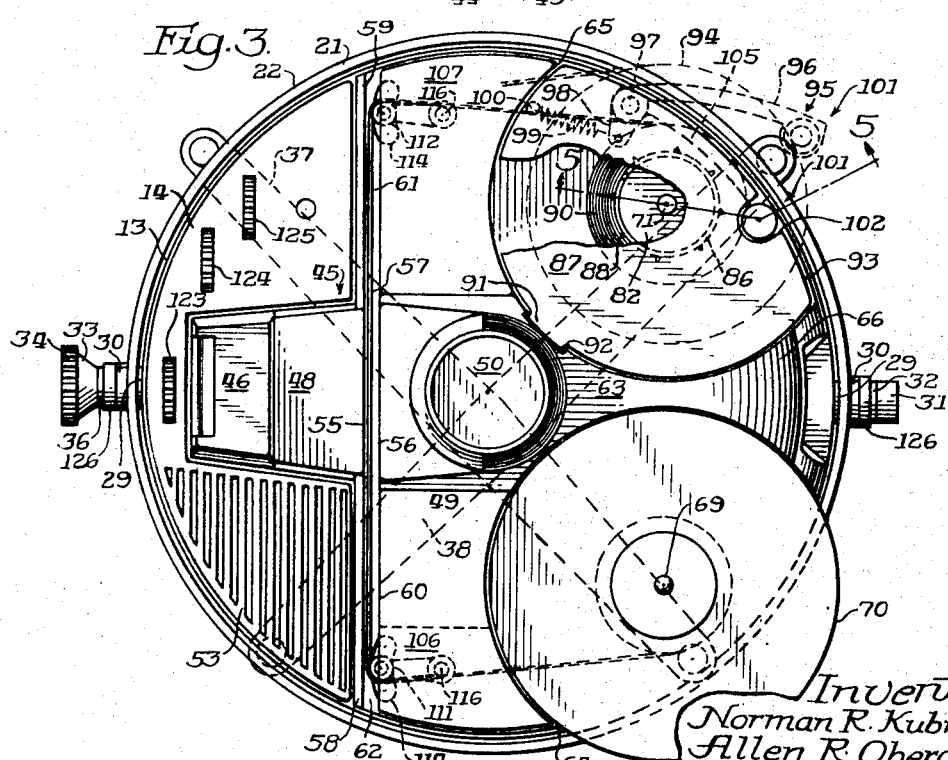
FIG. 3 is a plan view of the projector support looking toward the top of FIG. 2, parts being shown in dotted lines for the purpose of illustration.

Referring now more particularly to FIGS. 1–5, inclusive, of the drawings in which one embodiment of the invention is shown in detail there is seen a combination projector mechanism and casing or housing therefor, the housing or casing being generally designated 11. The housing or casing 11 comprises a camera support or mount section 12 which is shown here as being semi-spherical in configuration. However, the construction is not limited by such configuration inasmuch as semi-globular or semi-spheroidal configuration are considered to be equivalent. The casing section 12 may, as illustrated in FIGS. 2 and 3, define a shell on the upper rim 13 of which there is supported the annular shoulder 74 of a mounting plate, flat or base 14 which is disposed in a substantially horizontal plane.

In diametrically opposed positions, in what for the purpose of this description shall be considered the sides, the upper end portion of the shell comprising casing section 12 has a pair of opposed apertures 15 and 16. A stud 17 is horizontally projected through the aperture 15 and has a head 18 engaging the inner surface of the casing section 12 by reason of which said stud is retained from lateral displacement outwardly through aperture 15. A laterally slidable bolt or the like 19 is projected outwardly from the support member 12 through a suitable antifriction bushing 20 mounted in the aperture 16, said bolt being in coaxial alignment with the stud 17 and having a head 21 which abuts the inner surface of the casing section 12 by reason of which said bolt 19 is retained from removal from said casing section 12 laterally through aperture 16.

The housing or casing 11 comprises a cover section 21 which is in the form of a shell shown as being of the same configuration as casing section 12, however, being generated on a radius of curvature slightly larger than the radius of curvature on which the casing section 12 is formed, whereupon proper conditioning, by means to be hereinafter defined, casing section 12 can nest within casing section 21. Said casing section 21 defines adjacent the periphery 22 thereof a pair of horizontally aligned apertures 23 and 24 which are diametrically disposed in alignment with the apertures 15 and 16 to receive therethrough the stud 17 and the bolt 19, respectively, which define an axis of rotation for said casing section member 21. Therefore, and because of the disparity in the radii of curvatures of the casing sections 12 and 21, the housing or casing section 21 is adapted to be rocked about the casing section 12 on an axis of rotation defined by the stud 17 to cover the entire mounting plate 14 or uncover said mounting plate 14, either wholly, as illustrated in FIG. 3, or partially, as illustrated in FIG. 1. Although not specifically shown, when the casing section 21 is conditioned to full or complete closure, the external configuration of the entire casing 11 would be globe-like, being defined by an upper semi-globe 21 and a lower semi-globe 12, the rim 22 of casing section 21 slightly overhanging and spaced from the rim 13.

As illustrated, the casing 11 is supported on a stand or standard in the nature of a gimbals which is generally designated by the numeral 25 and which defines an arcuate yoke or U-shaped member 26 which is curved on a radius of curvature which is slightly larger than the radius of curvature on which the casing section 21 is formed. Thereby, the yoke may be disposed outwardly from and concentric with both the casing section 21 and the casing section 12. The yoke 26 is disposed substantially vertically and in its opposite upwardly extending end portions 126 has a pair of horizontally aligned apertures 27 and 28 through which the stud 17 and the bolt 19 project respectively for mounting said stand 25 relative to the casing 11. Disposed about the stem 17 and the bolt 19 between the casing section 12 and the casing section 21 are a pair of washers 29, 29. Disposed about the stem 17 and the bolt 19 between the casing section 21 and the opposite upper end portions 126 of the yoke 26, are a pair of washers 30, 30. As illustrated in FIG. 2, the outer end portion of the stud 17 is projected laterally outwardly from the yoke 26; and a retainer 31 which may be in the form of a cap having a flange 32, which is suitably secured to the outer surface of the yoke 26 about aperture 27 in any suitable manner, retains the stud 17 from displacement inwardly of the casing 11 through aperture 15. A take up nut 33 which may be knurled as at 34 for manipulation is mounted on the threaded end portion 35 of the bolt 19, said threaded end portion projecting laterally outwardly from the yoke 26. The nut 33 bears against a washer 36 which is disposed about said bolt 19 in engagement with the outer surface of the yoke about the aperture 28. The yoke 26 is preferably of slightly yieldable fabrication whereby manual control of nut 33, pressure can be applied or released to releasably impinge the casing 21 against washers 30 for releasable frictional retention in adjusted positions of rotation about the axis defined by stud 17 and bolt 19.

Standard 25 comprises a base defined by a pair of elongated crossed arms 37 and 38, said arms being crossed substantially midway between opposite ends thereof and being disposed in overlapping relationship where crossed. A vertically disposed fastener which may comprise a bolt 39 extends through aligned vertical apertures in the yoke 26 midway between its opposite ends and the overlapped portions of the arms 37 and 38. Said arms 37 and 38 are disposed below the yoke against which said arms are drawn by reason of a nut 41 which is threaded on the lower end portion of bolt 39 and which draws the head 40 thereof against the yoke to frictionally impinge the arms 37 and 38 and said yoke, as illustrated in FIG. 2. Depending from the outer end portions, respectively, of the arms 37 and 38 are a plurality of pegs, posts or blocks 54, each of which is the same height as the others and suitably secured for rigid retention on its respective arm end portion to serve as one of the feet upon which the casing 11 stands.

As further illustrated in FIG. 2, a carrying handle or grip 43 having a connecter 44 is secured by any suitable means to the center of the rockable casing section 21 whereby said casing 11 is rendered readily portable. The length and disposition of handle 43 is such that rotation of the casing section 21 will be limited to approximately 180 degrees from the fully closed position because abutting engagement of said handle and the arms 37 and 38 will preclude farther rotation.

As illustrated, a projector housing generally designated 45 is rigidly mounted on the plate 14. The housing 45 as fashioned comprises a lens housing section 46 in which there is mounted a projector lens 47, an intermediate housing section 48 in which there may be mounted mirror means for rectifying the light for direction of the image through the projector lens 47 and a lamp housing section 49 having an upwardly extending dome 50 defining an enlarged chamber 51 adapted to permit air to rise from about a lamp (not shown) in the housing section 49 and to escape from exhaust slots 52 provided in said dome.

It is seen that the lens housing section 46 is disposed to one side of the plate 14 with the disposition of the axis of the lens 47 being transverse to the axis defined by stud 17 and bolt 19. It is also observed that the lamp housing section 49 is disposed laterally of the lens housing section 46 in a manner such that light from the lamp in said housing 45 will enter the housing section 46 through an aperture therefor (not shown) along an axis which is normal to or transversally of the optical axis of the lens 47, and that the dome 50 is disposed substantially centrally of the plate 14 as is clearly seen in FIG. 3. The mounting plate 14 is fashioned for support therein of a slotted horizontal grill member 53 which constitutes an air intake through which air exhausted from the slots 52 is drawn into the projector housing 45 by suitable fan means disposed within housing 45 and of a construction which will be understood in the art and the details of which are not critical to the instant invention.

As illustrated in FIG. 3, the projector housing 45 is disposed along the diameter of the mounting plate 14, the housing sections 48 and 49 defining therebetween a pair of slightly spaced vertical flats 55 and 56 which serve as a track or guide for a film strip 57 carried through said housing 45 between a pair of aligned apertures (not shown) in the lamp housing and mirror housing sections 49 and 48, respectively. A pair of vertical walls 58 and 59 which extend from opposite sides of the mirror housing section 48 define a pair of flats which are coextensive with the flat 55 heretofore defined. A pair of vertical walls 60 and 61, which project upwardly from the plate 14 and extend in opposite directions from opposite sides of the lamp housing section 49, define a pair of flats which are coextensive with the flat 56 thereby defining above the surface of the plate 14 an elongated track 62 through which the film strip 57 is carried across the casing section 12.

By means of a manually operable knob 123 having a portion projecting outwardly through the plate 14 to control a mechanism (not shown) disposed below the plate 14 and the nature of which is understood, the details thereof being not critical to the present invention, focusing of the lens 47 may be achieved. Other knobs 124 and 125 which are in evidence by reference to FIG. 3 and which project through apertures therefor in the plate 14 may be used to control other projector mechanisms (not shown) which are understood in the art and the details of construction of which are not intended to limit the present invention. Additionally, attention is invited to the nut 33 which operating in the manner aforestated permits adjustment of the casing member 12 about the horizontal axis defined by the pin 17 and the bolt 19 to the end that vertical adjustment of the projector lens 47 may be effectuated.

The walls 60 and 61 define one side of a raised part of base or plate 14 and herein shown as a platform generally designated 63 and which may be considered as a raised portion of base or mounting plate 14. The platform 63 embodies the lamp housing section 49 and also defines a pair of semi-circular recesses 64 and 65 having sunken platform floors 67 and 72, respectively, said recesses generating therebetween a partition 66 which extends from the lamp housing 49 diametrically towards the periphery of the platform 63, said partition 66 curving upwardly as it extends outwardly from the center as illustrated in FIG. 2. By referring to FIG. 3, it is seen that the platform 63 can be re-characterized as covering about two-thirds of a contiguous area of a circle defined by the plate 14, the platform having a pair of arcuate recesses 64 and 65 with substantially equal radii of curvatures, said recesses occupying a pair of quadrants in the circle defined by said plate 14, the centers of curvatures of which are disposed on a line transversally of the axis of rotation of the housing sections 12 and 21. A partition 66, which extends from the dome 50 which occupies a substantially centered position with respect to the plate 14, curves upwardly from the platform 63 as it extends peripherally partially defining the recesses 64 and 65 along the diameter of said plate 14.

The recess 64 together with its sunken platform floor 67 defines a seat for a conventionally dimensioned film strip supply reel 68 which, although shown in FIGS. 2 and 3, has been omitted from FIG. 1 to better show the relationship of the structural components comprising the invention. The supply reel 68 is adapted to be mounted about a spindle 69 which extends upwardly vertically from the recess floor 67, said spindle being disposed substantially at the center of curvature of the recess 64. By referring to FIGS. 2 and 3, it is seen that said reel 68, if having a radius of curvature equal to the radius of curvature of the recess 64 when mounted on the spindle 69, will provide an overhanging portion 70 which extends beyond the periphery of the platform 14 and the casing 11, and with the device thusly conditioned the casing section 21 will not be able to fully close. Therefore it is intended when employing the embodiment illustrated in FIG. 1 that the supply reel 68 be removably mounted and that when it is desired to completely inclose the projector construction that such reel 68 be removed from its spindle 69.

Figure 4:
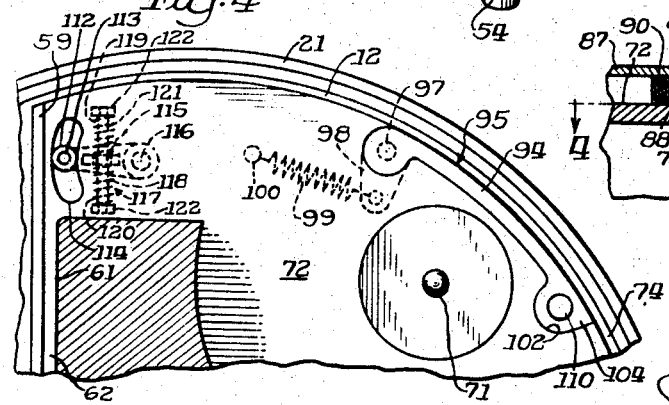
FIG. 4 is an enlarged fragment of a horizontal sectional view taken substantially on the line 4—4 of FIG. 5 and showing parts of the film take-up mechanism in plan.
Figure 5:
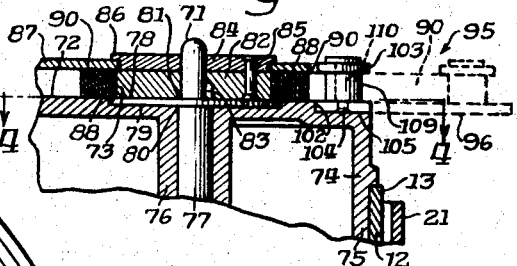
FIG. 5 is a vertical sectional view taken along the line 5—5 of FIG. 3 and looking in the direction of the arrows, the view being distorted horizontally for the purpose of illustration.

A rewind spindle 71, which is illustrated in FIGS. 3, 4, and 5, projects upwardly from the floor 72 of the recess 65 in which said spindle is centered, as illustrated in FIG. 5 in which there is also shown the manner in which annular flange 74 engages rim 13 for support of platform structure 63, its support being assisted by means of an integral depending part 75 which fits down into the casing section 12, the external diameter of said part 75 being substantially the same as the internal diameter of casing section 12 along the area of fit. An integral bushing or sleeve depends normally from the floor 72 into casing section 12, as illustrated in FIG. 5. Extending through said bushing is the drive shaft 77 of motive means (not shown) by which a circular plate 78, which is disposed in a countersunk recess 79 of floor 72, is rotated by said drive shaft 77, the lower surface of said plate 78 being secured to the upper end of said drive shaft 77 by welding, brazing or equivalent means as shown at 80 in FIG. 5. The spindle 71 which is coaxially aligned with drive shaft 77 has its lower end portion centered with respect to said plate 78 and rigidly secured to the upper surface thereof by welding, brazing or the like as at 81, whereby the spindle 71 is driven with the shaft 77. A hub 82 is constrained for rotation with the spindle 71 by means of keying or the like as at 83. A cap, disc or flange 84 which is spaced above the plate 78 and parallel thereto also is constrained for rotation with the spindle by means of suitable fasteners or connecters such as rivets 85 one of which is shown and secures said hub to said flange 84. The disc or plate 84 has an upper peripheral extension 86, which, as it rotates, rides along the upper surface of a stationary flat film roll cover or flat ring-like member 87 which is mounted in an upper portion of the recess 65 about hub 82, said roll cover 87 being spaced from the floor 72 of said recess by a distance substantially equal to the width of the film strip 57. A toothed band 73, which has a plurality of outwardly projecting peripheral teeth 88 in frictional but somewhat slipping engagement with the peripheral surface of hub 82 is mounted under peripheral extension 86. The teeth 88 are spaced from each other a distance equal to the spacing between conventional notches 89, only some of which are shown in FIG. 2 in the film strip or band 57. Thereby, the lead end of a strip of film 57 can be manually anchored about the band 73, and as said strip is fed or driven toward the take up position from the projector housing 45, it will be wound in a roll 90 of ever increasing diameter about the band 73 between the floor 72 and the roll cover 87.

As illustrated in FIG. 3, the roll cover 87 is restrained from rotation by means of a lug, boss or key 91 which engages in a recess 92 formed in the platform 63 adjacent said roll cover. In addition, the roll cover 87 is held in proper spaced relationship from the floor 72 by platform support of said lug 91 and the support of band 73 to the inner periphery of cover 87. Moreover, it is observed that the cover 87, while defined by a peripheral arc substantially of the radius of recess 65, is also defined by an arcuate side 93 which is concentric with and falls narrowly within the rim 13 of the casing section 12, said side 93 being disposed centrally of the periphery of a circle formed on a radius of the recess 65 in the center of which recess the take-up spindle 71 is disposed. Accordingly, before the roll 90 is large enough to fully occupy the recess 65, a roll overhang 94 will be generated, as illustrated in dotted lines in FIG. 3, which overhang will extend outwardly beyond casing 11.

To the end that the portion of the roll comprising the overhang 94 is properly managed, a rockable boss or film support member generally designated 95 is provided. As illustrated in FIGS. 4 and 5, said boss or film support member 95 comprises an arm 96 which is shown disposed at a level equal to the floor 72. Accordingly, to accommodate the arm 96 the floor 72 is countersunk peripherally as at 105 with the inner end portion of said arm 96 being pivotally connected as at 97 in a part of the arcuate countersunk recess 105. A lever-like extension 98 operably connected to said arm and projected outwardly from the pivot at 97 below recess floor 72 is anchored to one end of an expansion spring 99 the opposite end of which is suitably anchored as at 100 to bias the extension 98 and accordingly, the free end 101 of said arm 94 toward parallel peripheral notches 102 formed in the cover 87 and floor 72, as illustrated in FIG. 3. The notches 102 serve as a seat in which the free arm end 101 may normally engage within the periphery of casing section 12 when not held outwardly by the film roll 90 to thereby permit the casing section 21 to be completely closed. As illustrated in FIG. 5, the free end 101 of the guide arm 96 has upper and lower flanges 103 and 104 which are spaced apart at a distance equal to the spacing between the cover 87 and the floor 72, that is to say, the distance equal to the width of the film strip 57. The flange 104 is a horizontal extension of the arm 96 and accordingly, is accommodated in the countersunk recess 105 of the floor 72, as illustrated in solid lines in FIG. 5. Between the flanges 103 and 104, a roller 109 may be suitably journalled about a vertical pin 110, as illustrated in FIG. 5.

The recesses 64 and 65 are extended horizontally above the floors 67 and 72 beneath a pair of upper platform shelves 106 and 107 to provide a pair of outwardly opening recesses 108 only one of which is clearly seen in FIG. 1. The recesses 108 extend through the vertical walls 60 and 61 to define openings in which there are mounted a pair of film guide rollers 111 and 112 the relative disposition of which is seen in FIG. 3.

As clearly illustrated in FIG. 4, in which only the roller 112 is shown, each of the rollers 111 and 112 is journalled on the upper end portion of a pin 113 which is projected upwardly through an arcuate slot 114, said slots 114 being formed, respectively, in the floors 67 and 72. The height of the pins 113 is such that rollers 111 and 112 are disposed in the recesses 108 beneath the shelves 106 and 107, respectively, the disposition of such slots 114 and the diameters of the rollers 111 and 112 being such that the rollers project into opposite end portions of the track 62, as illustrated in FIG. 3. The lower end portions of the pins 113 comprising the rollers 111 and 112 are disposed below their respective floors 67 and 72 where each is fashioned integral with or connected to a horizontally extending arm 115 the end of which distal to its respective of rollers 111 and 112 is pivotally connected beneath its respective of said floors 67 and 72 as at 116. Thereby, each of the rollers 111 and 112 is free to swing about a vertical axis within the limits of its slot 114 as film is drawn through the slot or track 62. A horizontally disposed pin 117, which is rigidly suspended beneath each of the floors 67 and 72 and which is projected through each of the arms 115 transversally thereof in an enlarged slot or aperture therein (not shown), provides a pair of transverse extensions 118 and 119 which are disposed at opposite sides of their respective arm 115. A pair of compression springs 120 and 121 are mounted about each pair of extensions 118 and 119, respectively, one end of each spring of an associated pair bearing against a boss or abutment such as a nut 122 which is mounted on the outer end of its respective of the rod extensions 118 and 119 of a pair thereof, and the opposite end of each spring of a pair thereof bearing against one of the opposite sides of a respective arm 115 to bias such arm to a centered position against forces generated by the moving film strip 57 and tending to uncenter arm such 115 from its centered positions. If desired, the rollers 111 and 112 may also be biased by suitable means, which will be appreciated by those knowledgeable in the art, to move from right to left with respect to FIG. 4, in which event the transverse dimension of the slots 114 would be increased to accommodate such adjustability.

Having thus described the details of construction of the invention, a brief recapitulation and description of the manner in which the embodiment heretofore described operates will ensue to the end that understanding will be facilitated. The recess 67, illustrated as being unoccupied in FIG. 1, provides a seat for a supply reel 68 which is shown mounted in FIGS. 2 and 3. The lead end of the film strip 57 is drawn from the reel 68 and threaded across the guide rollers 111 and 112 through the track 62 between the projector housing sections 48 and 49. Light which is emitted through an aperture (not shown) from a lamp (not shown) in the housing section 49 is projected through the film strip 57 along a horizontal axis into an aperture or opening (not shown) in the housing 48 where the light is rectified for direction normal to its path from the housing section 49 to the housing section 48 to the end that such light may be projected through the lens 47. The lead end of the film 57 is anchored on the teeth 88 of the band 73 which is driven with the take up spindle 71, to take up film fed from the projector housing 45. Although band 73 is adapted to slip on hub 82, slipping diminishes as the pressure of film roll 90 increases on said band 73 to impinge the same on hub 82 in a manner which is known in the art. The film may be fed from the projector housing 45 by known means and to such end the projector may be of the simple sprocketless type in which shock absorbers are provided to smooth out the transition between the intermittent movement of the projector shuttle and the constant tension applied by the take up spindle 71, or the feed mechanism may be a sprocket type drive, similar to that disclosed in United States Letters Patent 3,137,201 issued June 16, 1964 to P. E. Uterhart. Simultaneously with the driving or feeding of the film by the projector, a roll 90 of film strip 57 is wound about the band 73 as take up spindle 71 may also be of a known type. Therefore, it is intended that neither the details of construction of the projector film feed nor the take up drive mechanism be limiting on the instant invention.

As the roll 90 enlarges by reason of operation of the projector and the take up of the film strip about the spindle 71, the diameter of the roll 90 will increase to a size which is shown in the solid line of FIG. 3, at which time the roll 90 will just engage the free end 101 of arm 96 which then will be engaged in notches 102 under the biasing of spring 99, as illustrated in solid line in FIGS. 3 and 5. However, as the size of the roll 90 continues to increase by reason of the feeding and take up of more film strip 57, the end 101 of arm 96 will be rocked about its pivot 97 out of the notches 102 to, for example, a position to which it is conditioned by the size of the roll 90 which is illustrated in dotted line in FIGS. 3 and 4. In such condition, roll 90 will have generated an overhang 94 requiring support of the arm 96. The size of roll 90 may be further increased to a diameter greater than shown in FIGS. 3 and 4, namely to a size having a radius substantially equivalent to the radius of curvature of the recess 65. Of course, then the arm 96 will accordingly follow such increase in roll size.

To rewind, it is only required that the pressure plate of the projector (not shown) be released after which the film may be reversely driven, either through the track 62 or by removing it from the track 62, and rewound on reel 68 by known means the details of which are not illustrated as they are not intending to be limiting on the present invention. As the roll 90 diminishes by reason of rewinding, the normal spring biasing of the arm 96 through the action of the spring 99 will cause the free end 101 of said arm 96 to return to the notches 102. Upon manual disengagement of the normal lead end of the film from the band 73 and removal of the reel 68 from spindle 71, the housing 11 will have become conditioned for closing. To that end, the nut 33, which will have been previously tightened to secure the casing section 12 at an adjusted rotational angle to selectively set the vertical inclination of the optical axis of the lens 47, will then be loosened to return the casing section 12 to gravity suspended position about its axis of rotation and to release the casing or cover section 21. To then close the casing 11, the handle 43 will be gripped and rocked upwardly carrying with it the casing section 21 to full projector covering position. Thereafter, the nut 33 may be tightened to secure casing section 21 in such closed position. In such condition, the handle 43 will be disposed approximately 180 degrees from the position shown in FIG. 2 and provide means by which the fully closed casing 11 may be simply and easily manually translocated.

Reference now is had to the modified embodiment of the invention illustrated in FIG. 6 in which a vertical projector generally designated 211 is disclosed. The vertical projector comprises a housing generally designated 245 which is characterized by a forwardly projecting lens barrel 246 on which there is rotatably mounted a focusing adjustment member 263 for adjusting lens 247 within and longitudinally of said lens barrel. Fashioned with the housing 245 and disposed at the aft end portion thereof is a lamp housing 249 the upper wall of which defines an exhaust grill 252 for the escape of air from said lamp housing 249. While the projector housing 245 may be of substantially conventional construction it defines at the front of the lamp housing 249 a vertical slot (not shown) through which film may be drawn for projection therethrough of light thereafter to be projected from the lens 247. Conventional control knobs 264 and 265 are provided for operation of projector mechanisms (not shown) disposed within the projector housing 245.

One side of the projector housing is secured against a vertical mounting plate 214 having apertures in which there are mounted a pair of anti-friction bushings or the like 268 and 270 through which there are projected outwardly from the mounting plate 214 a pair of spindles 269 and 271. Said spindles are adapted to operatively support a film supply reel and a film take up reel, respectively, for operation in a conventional manner.

The mounting plate 214 is mounted in the vertically disposed opening 213 of a casing or mount section 212 which defines a shell of semi-globular, semi-spherical or semi-spheroidal configuration. The housing or casing section 212 in the embodiment illustrated in FIG. 6 corresponds to the housing or casing section 12 of the embodiment of the invention illustrated in FIG. 1. The mounting plate 214 is substantially circular in outline having inner flat and outer flat faces with its radius of curvature being less than the radius of curvature of the opening 213. From the peripheral limits of mounting plate 214 a plurality of mounting lugs 215 project radially outwardly. By means of fasteners such as screws or the like 216, said radial lugs are connected to the ring-like peripheral portion 217 of a flat mounting member, the remainder of which is not in evidence in the drawing. However, by means of fasteners such as screws 218 which extend through the housing member 212, the ring-like portion 217 is secured against the inner surface of housing or casing member 212, said ring-like portion 217 being spaced inwardly slightly from the vertical opening 213.

The peripheral ring portion 217 has an elongated slot 253 which serves as an air intake, said slot 253 being communicatively connected with the chamber 251 within the lamp housing by an apparent means, the air being circulated by known means such as a fan or the like (not shown) which may be disposed within the housing 245. An outer cover or casing section 221 of shell-like construction and corresponding to the casing section 21 of FIG. 1 is pivotally connected to the casing section 212 in a manner and by means which may be the same as that disclosed for rockably and adjustably connecting together casing sections 12 and 21. Thereby casing sections 212 and 221 are relatively adjustable with respect to each other to cover and uncover the opening 213 and the camera 211 mounted on the plate 214 disposed therein.

The essential difference between the embodiment illustrated in FIGS. 1–5 and that illustrated in FIG. 6 is that the casing sections 12 and 21 of the former are rockably adjustable about a horizontal axis, whereas, casing sections 212 and 221 of the latter are rockable or adjustable about a vertical axis. In the embodiment illustrated in FIG. 6, the handle 234 has an internally threaded connector 233 which corresponds to the nut 33. Connector 233 may be threadedly mounted on a vertically projected bolt or an equivalent (not shown) and defining a vertical axis of rotation about which the sections 212 and 221 are adjustable. The stem 217 of a standard generally designated 241 may, by means apparent in view of the disclosure relative to FIGS. 1–5, inclusive, be connected to the lower end portion of the means defining the vertical axis of rotation for said section 212 and 221. It is appreciated that the nut 233 may be employed to releasable secure the members 212 and 221 in selected positions of adjustment about a vertical axis in a manner shown for releasable securance of casing sections 12 and 21. In connection with the embodiment of FIG. 6, it is interesting to note that by reason of the fact that there is no deterrence to the rotation of the section 221 about the member 212, said member 221 may rotate about its vertical axis 360 degrees relative to said member 212.

Secured to the lower end portion of the stem 217 are the inner end portions of a plurality of radially extending legs 237, 238 and 239 which slope downwardly as they extend outwardly. On the outer end portions of said legs there are rigidly secured a plurality of feet or blocks 242, 243, and 244 respectively. While the feet or blocks 242 and 243 may be fashioned as integral or unitary members, the block or foot 244 comprises an upper part 245 having a downwardly opening internally threaded bore and a lower foot-part 246 having a knurled outer surface 248 and carrying an upwardly projected threaded stem 247 vertically engaged in the upper part 245. Upon manual adjustment of the lower adjustable foot-part 246, the projector will be rocked to adjust the vertical inclination of the optical axis of lens 247 about a rotational axis defined by the feet 242 and 243.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

The embodiments of the invention in which an exclusive property or privilege is claimed are defined as follows:

1. A self-storing projector construction comprising:
   a pair of nestable casing sections rockably mounted relative to each other into and out of nesting relationship;
   a projector mounting member mounted on one of said housing sections;
   a projector housing mounted on said projector mounting member;
   a projector lens supported in said projector housing, and releasable locking means for securing said casing sections in adjusted rotational positions,
      the other of said casing sections defining a cover adapted with the first mentioned casing section to enclose the projector housing.

2. A self-storing projector construction as defined in claim 1 in which the mounting member is disposed in a substantially horizontal plane, and having means for rocking said casing sections about a horizontal axis.

3. A self-storing projector construction as defined in claim 1 in which the mounting member is disposed in a substantially vertical plane, and having means for rocking said casing sections about a vertical axis.

4. A self-storing projector construction as defined in claim 1 in which said locking member comprises a take-up mechanism for releasable frictional securance of said casing sections in adjusted positions.

5. A self-storing projector as defined in claim 1 further characterized by means rockable about a horizontal axis for adjusting the inclination of said projector housing in a vertical plane whereby the inclination of the optical axis of said projector lens can be adjusted.

6. A self-storing projector as defined in claim 2 further characterized in that when nested one of said casing sections is the inner thereof and rockable within the other thereof, said inner casing section supporting said mounting member, whereby upon securance of said inner casing section at selected angular attitudes the inclination of the optical axis of said projector lens in a vertical plane can be selectively set.

7. A self-storing projector as defined in claim 3 and further characterized by a standard; said nestable casing sections rockable mounted on said standard; a plurality of feet members supporting said standard, one of said feet members being vertically adjustable to rock said standard about others of said feet members whereby said projector is adjustable to adjust the inclination of the optical axis of said projector lens in a vertical plane.

8. A self-storing projector construction comprising:
   a pair of semi-global casing members having ring-like end portions disposed in overlapped relationship,
      a first of said casing members defining a shell into and out of which the second of said casing members is relatively rockable,
   standard means for rockably supporting said casing members;
   means defining an axis of rotation about which the ring-like end portions of said casing members are rotatable relative to said standard;
   a projector mounting member carried by the second of said casing members;
   a projector housing mounted on said projector mounting member, and
   releasable pressure applying means for frictionally securing said casing members to each other and said standard in adjusted angular positions of rotation to expose the projector and to cover the same with the first of the casing members.

9. A self-storing projector construction as defined in claim 8 in which the semi-global casing members are respectively generated on axes of rotation of varying lengths whereby said casing members are adapted for nesting one within the other, the second of said casing members being the inner thereof when nested, the first of said casing members being the outer thereof when nested and adapted to rock about the second of said casing members to expose and cover said projector.

10. A self-storing projector construction as defined in claim 8 in which the releasable pressure applying means comprises a pair of axis defining members mounted in opposed relationship diametrically of said ring-like end portions, one of said axis members being projected through and slidable in said casing members and said standard, said last mentioned axis member having means for limiting outward movement and a threaded end portion projected outwardly from said standard, and a nut threaded on said threaded end portion to draw together and release the ring-like end portions of said casing members and said standard.

11. A self-storing projector construction comprising:
a semi-globular projector mounting member defining an end mounting section having a space therein;
a shell-like semi-globular cover member of larger dimensions than said projector mounting member and rockably connected thereto,
said cover member adapted for nesting and covering relationship with said projector mounting member;
means defining a projector mount connected on said end mounting section;
a projector housing structure including a lamp housing section carried by said projector mount and defining air exhaust means,
said projector mount defining air inlet means communicatively connected through said space to said air exhaust means
whereby air can be circulated through said lamp housing section to cool said projector housing.

12. A projector construction comprising:
means defining a projector housing having predetermined physical limits, said housing defining a track adapted for guiding a strip of film through said housing for projection;
means providing a support for a film strip supply member;
means normally within the limits of said housing providing a support member for a film take-up roll, said support member being expansible beyond the limits of said housing, said means including:
a flat adapted to support convolutions of a film strip take-up roll;
an axis member projecting outwardly from said flat and adapted as a center for a film strip take-up roll;
a rockable support arm pivoted adjacent and having a portion in the plane of said flat, thereby to support convolutions of a take-up roll extending beyond said flat; and
means for moving a film strip through said track from a film strip supply member to the expansible support member,
whereby said support member is expanded from within said limits to beyond said limits as said film strip roll increases in diameter.

13. A projector construction as defined in claim 12 further characterized by motive means for driving said axis member; strip securing means adapted to connect a film strip to said axis member for formation of a roll as said axis member is rotated, and a roll cover mounted parallel to said flat and spaced therefrom a distance substantially equal to the width of a film strip that said flat is adapted to accommodate.

14. A self-storing projector construction comprising:
a pair of nestable casing sections rockably mounted relative to each other into and out of nesting relationship;
a standard rockably connected in supporting relationship to said casing sections;
a mounting member mounted on one of said housing sections;
a projector housing mounted on said mounting member;
a projector lens supported in said projector housing, and releasable locking means for securing said casing sections in adjusted positions, relative to each other and to said standard,
one of said casing sections defining a cover adapted with the other casing section to enclose the projector housing.

References Cited
UNITED STATES PATENTS

| | | | |
|---|---|---|---|
| 1,491,575 | 4/1924 | Wilson | 88—24 X |
| 2,431,847 | 12/1947 | Van Dusen | 88—24 |
| 2,876,338 | 3/1959 | Seligson | 240—1.3 |
| 3,135,156 | 6/1964 | Thevenaz | 352—243 X |
| 3,234,848 | 2/1966 | Stoothoff | 88—24 |
| 2,525,552 | 10/1950 | Kingston | 352—104 |

NORTON ANSHER, *Primary Examiner.*

M. H. HAYES, *Assistant Examiner.*